United States Patent [19]

Shimokoriyama

[11] Patent Number: 5,475,439
[45] Date of Patent: Dec. 12, 1995

[54] IMAGE PROCESSING APPARATUS WITH CHROMINANCE PROCESSING AND LUMINANCE DELAY

[75] Inventor: Makoto Shimokoriyama, Kanagawa, Japan

[73] Assignee: Canon Kabushiki Kaisha, Tokyo, Japan

[21] Appl. No.: 408,101

[22] Filed: Mar. 21, 1995

Related U.S. Application Data

[63] Continuation of Ser. No. 76,987, Jun. 14, 1993, abandoned.

[30] Foreign Application Priority Data

Jun. 18, 1992 [JP] Japan .................................. 4-159764

[51] Int. Cl.$^6$ ................................................. H04N 11/14
[52] U.S. Cl. ............................ 348/493; 358/320; 360/22; 348/472
[58] Field of Search ................................. 348/492, 493, 348/708, 472, 663; 358/310, 320, 324, 325; 360/22; H04N 11/14

[56] References Cited

U.S. PATENT DOCUMENTS

| | | | |
|---|---|---|---|
| 4,464,685 | 8/1984 | Wilkinson | 358/15 |
| 4,520,386 | 5/1985 | Asaida | 358/13 |
| 4,549,201 | 10/1985 | Tanaka et al. | 358/13 |
| 4,701,783 | 10/1987 | Glenn | 358/16 |
| 5,140,408 | 8/1992 | Kaite et al. | 358/21 R |
| 5,253,076 | 10/1993 | Adachi | 358/310 |
| 5,257,107 | 10/1993 | Hwang et al. | 360/22 |

FOREIGN PATENT DOCUMENTS 6372288  4/1988  Japan ............................. H04N 11/14

*Primary Examiner*—James J. Groody
*Assistant Examiner*—Jeffrey S. Murrell
*Attorney, Agent, or Firm*—Robin, Blecker, Daley & Driscoll

[57] ABSTRACT

An image processing apparatus for performing digital signal processing on an input color video signal is provided with a delay circuit for cancelling a time difference which occurs between a luminance signal component and a chrominance signal component of the input color video signal in accordance with a difference between a filtering processing for the luminance signal component and a filtering processing for the chrominance signal component.

13 Claims, 3 Drawing Sheets

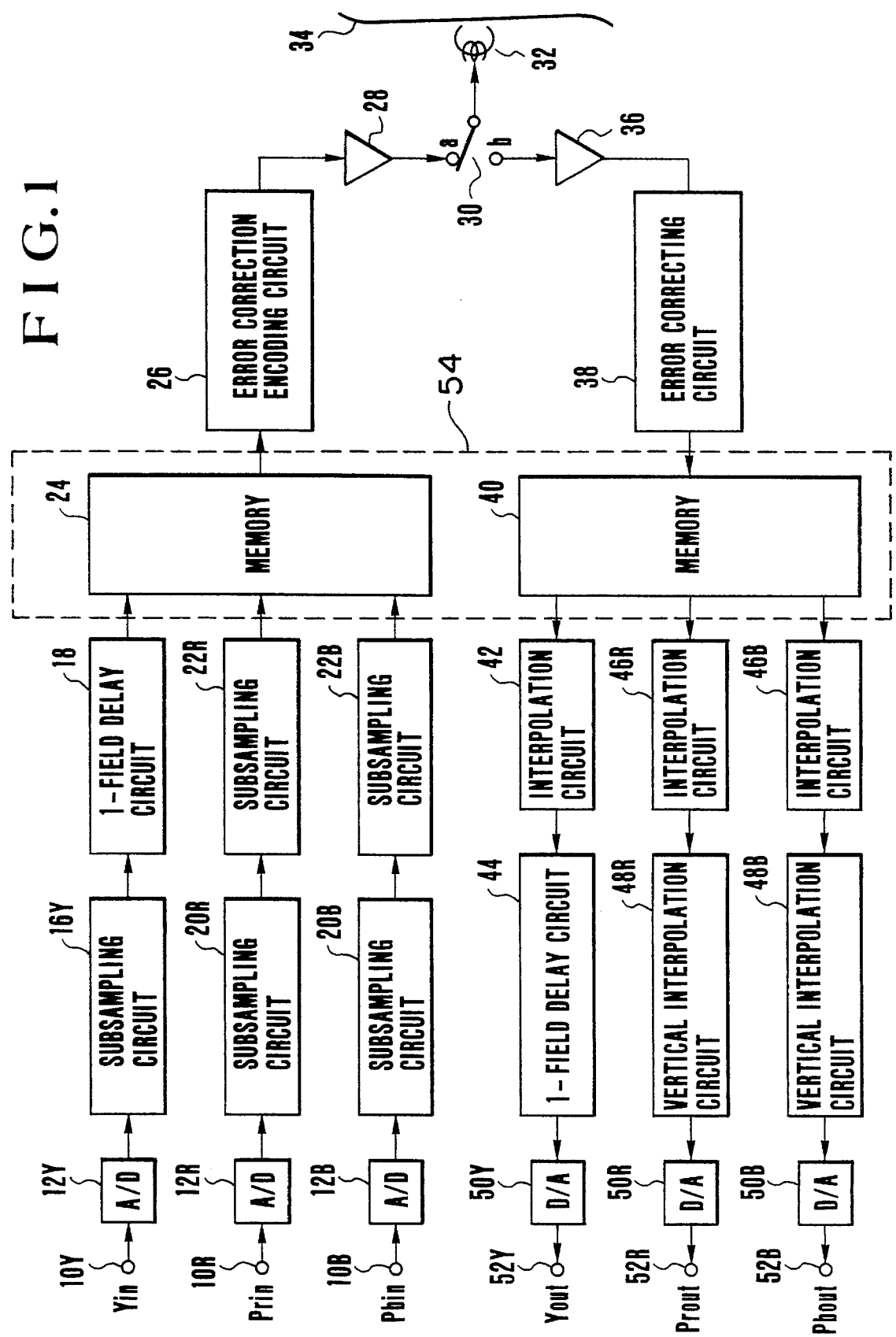

FIG.2(a)
FIG.2(b)
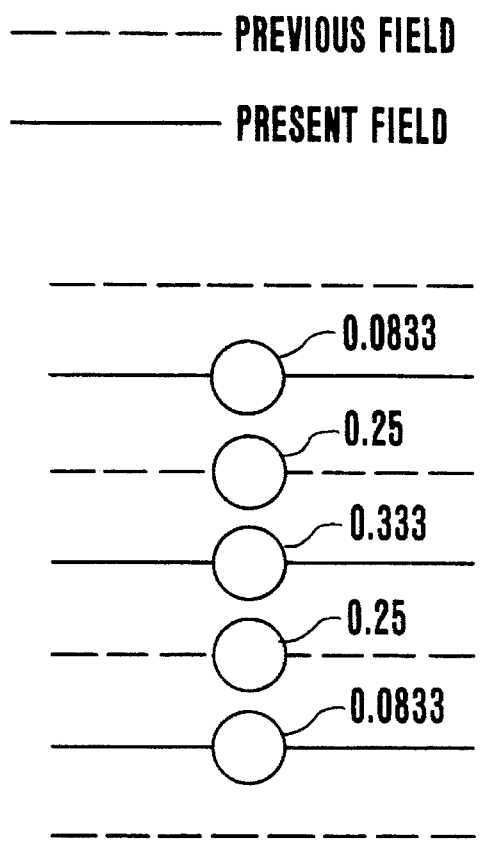
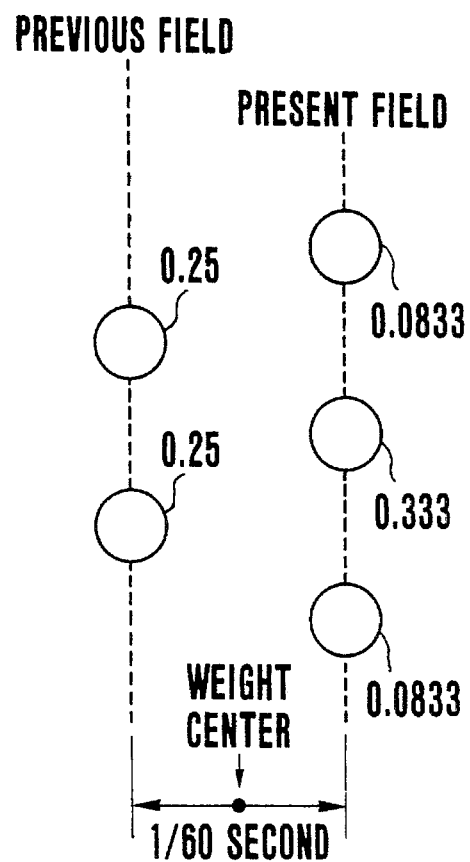

IMAGE PROCESSING APPARATUS WITH CHROMINANCE PROCESSING AND LUMINANCE DELAY

This is a continuation application under 37 CFR 1.62 of prior application Ser. No.08/076,987, filed Jun. 14, 1993, now abandoned.

BACKGROUND OF THE INVENTION

1. Field of the Invention

The present invention relates to an image processing apparatus for performing digital signal processing (for example, compression/expansion) on a color video signal.

2. Description of the Related Art

With the development of semiconductor techniques and image processing techniques, various image processing apparatus have been proposed and put into practice, such as an apparatus for recording and reproducing a television signal on and from a magnetic tape, a magnetic disk, an optical disk, a magneto-optical disk or other recording medium and an apparatus for transmitting a television signal to a remote place.

However, if the digital signal of a moving-image signal such as the television signal is to be transmitted (or recorded) without modification, a huge transmission capacity (recording capacity) and a high-speed processing circuit are needed. Accordingly, it is normal practice to compress the digital signal and transmit (record) the compressed digital signal and to expand the compressed digital signal on a receiving (reproducing) side. Typical examples of compression methods are subsampling and high-efficiency coding, and various other compression methods have been researched and proposed.

In normal practice, a luminance signal and color-difference signals which constitute a color video signal are processed by different processing lines because the luminance signal and the color-difference signals, if visually displayed, produce different effects on the visual sensation of human beings. For example, a digital video tape recorder (digital VTR) has been proposed which is arranged to apply intrafield processing to a luminance signal and interfield processing to color-difference signals. In this case, a deviation or a delay in time occurs between the luminance signal and the color-difference signals on a recording medium. In an expansion processing executed during reproduction, such deviation, i.e., a time delay, is cancelled or absorbed by delay means.

However, if the time delay is present between the signal components of the color video signal on the recording medium in the above-described manner, a reproduced image of a fast moving object will exhibit a deviation between luminance and chrominance even during normal reproduction. Also, if a single frame image is repeatedly reproduced as in the case of slow reproduction, a deviation between luminance and chrominance becomes distinct even if there is no fast motion in the reproduced image.

SUMMARY OF THE INVENTION

It is, therefore, an object of the present invention to provide an image processing apparatus capable of solving the above-described problems.

To achieve the above-described object, according to one aspect of the present invention, there is provided an image processing apparatus for performing digital signal processing on an input color video signal, and the image processing apparatus comprises delay means for cancelling a time difference which occurs between a luminance signal component and a chrominance signal component of the input color video signal in accordance with a difference between a filtering processing for the luminance signal component and a filtering processing for the chrominance signal component.

By the aforesaid delay means, it is possible to cancel a temporal deviation occurring between the individual signal components of the input color video signal, whereby subsequent processing is facilitated. For example, in a recording and reproducing apparatus, it is possible to prevent a deviation from occurring between the chrominance and the luminance of a reproduced image of a fast moving object or a similar deviation from occurring during special reproduction such as slow reproduction.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIG. 1 is a block diagram schematically showing the arrangement of one embodiment of the present invention;

FIGS. 2(a) and 2(b) are explanatory diagrams which serve to explain the tap coefficients of a spatial filter of each of the subsampling circuits 20R and 20B shown in FIG. 1.

DETAILED DESCRIPTION OF THE PREFERRED EMBODIMENT

Figure 3A:
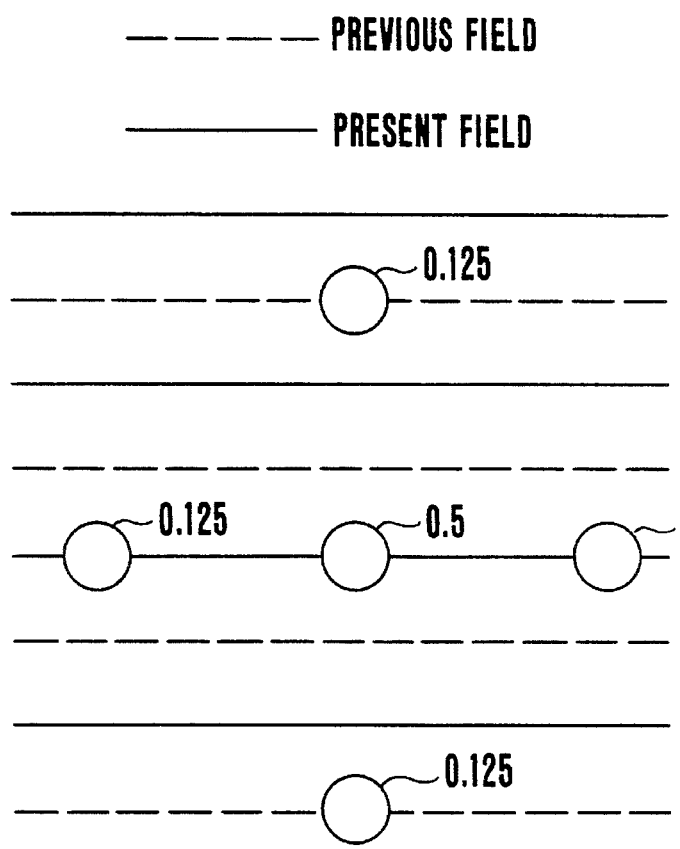
FIGS. 3(a) and 3(b) are explanatory diagrams which serve to explain the tap coefficients of a spatial filter of each of the subsampling circuits 22R and 22B shown in FIG. 1.

A preferred embodiment of the present invention will be described below with reference to the accompanying drawings.

FIG. 1 is a block diagram schematically showing the arrangement of the embodiment of the present invention which is applied to a digital VTR.

The arrangement shown in FIG. 1 includes input terminals 10Y, 10R and 10B for receiving, as their respective inputs, a luminance signal Yin, a color-difference signal Prin and a color-difference signal Pbin of a video signal to be recorded, and A/D converters 12Y, 12R and 12B for converting the luminance signal Yin, the color-difference signal Prin and the color-difference signal Pbin supplied from the respective input terminals 10Y, 10R and 10B into corresponding digital signals.

The shown arrangement also includes a subsampling circuit 16Y for subsampling the digital output (luminance signal Y) of the A/D converter 12Y by line offset subsampling. The subsampling circuit 16Y serves also as a spatial filter for eliminating an aliasing noise produced by spatially subsampling the digital output (luminance signal Y) of the A/D converter 12Y. The shown arrangement also includes a delay circuit 18 for delaying the output of the subsampling circuit 16Y by a 1-field interval. The delay circuit 18 is provided for making a time adjustment relative to each line for processing color-difference signals Pb and Pr.

The arrangement also includes subsampling circuits 20R and 20B for subsampling the respective digital outputs (color-difference signals Pr and Pb) of the A/D converters 12R and 12B to prepare color-difference signals the data sizes of which are respectively reduced to ⅓ in their vertical directions, and subsampling circuits 22R and 22B for spatially subsampling the respective outputs (color-difference signals Pr and Pb) of the subsampling circuits 20R and 20B by field offset subsampling to prepare color-difference signals the data sizes of which are respectively reduced to ½. Each of the subsampling circuits 20R, 20B, 22R and 22B serves also as a spatial filter for eliminating an aliasing noise.

The arrangement also includes a memory 24 for temporarily storing the subsampled luminance data outputted from the delay circuit 18 and the subsampled color-difference data outputted from the subsampling circuits 22R and 22B and rearranging the subsampled luminance data and the subsampled color-difference data so that they can be recorded on a recording medium, an error correction encoding circuit 26 for adding an error-correcting code to data read from the memory 24, a recording amplifier 28 for amplifying the output of the error correction encoding circuit 26 to a predetermined level, and a switch 30 which, during recording, is connected to a contact "a" to apply the output of the recording amplifier 28 to a magnetic head 32, and, during reproduction, is connected to a contact "b" to apply the reproduction output of the magnetic head 32 to a reproduction processing system. Reference numeral 34 denotes a magnetic tape which serves as the recording medium.

The arrangement further includes a reproducing amplifier 36 for amplifying the reproduction output of the magnetic head 32 received via the switch 30, an error correcting circuit 38 for receiving the output of the reproducing amplifier 36 and correcting a recording or reproduction error on the basis of the error-correcting code added by the error correction encoding circuit 26, a memory 40 for temporarily storing the reproduced data subjected to the error correction executed by the error correcting circuit 38 and rearranging the stored data in an order according to a later reproduction processing. Although not specifically referred to herein, the memory 24 and the memory 40 may also be constructed by using a common hardware.

The arrangement also includes an interpolation circuit 42 for interpolating data which were not selected during the subsampling executed by the subsampling circuit 16Y into the reproduced luminance data outputted from the memory 40, a delay circuit 44 for delaying the luminance data interpolated by the interpolation circuit 42 by a 1-field interval, interpolation circuits 46R and 46B for performing interpolations for field offset subsampling on the respective reproduced color-difference data outputted from the memory 40, and vertical interpolation circuits 48R and 48B for performing interpolations for the subsampling executed by the corresponding subsampling circuits 20R and 20B on the respective outputs of the interpolation circuits 46R and 46B.

The arrangement also includes D/A converters 50Y, 50R and 50B for converting the respective outputs of the delay circuit 44 and the vertical interpolation circuits 48R and 48B into analog signals, and output terminals 52Y, 52R and 52B for outputting the luminance signal Y and the color-difference signals Pr and Pb outputted from the respective D/A converters 50Y, 50R and 50B to the outside.

The basic operation of the arrangement shown in FIG. 1 will be described below. The luminance signal Yin, the color-difference signal Prin and the color-difference signal Pbin of a video signal to be recorded are respectively inputted to the input terminals 10Y, 10R and 10B. The A/D converter 12Y converts the luminance signal Yin inputted from the input terminal 10Y into a digital signal at a sampling frequency 2 fs, and the subsampling circuit 16Y applies a filtering processing for aliasing elimination to the output data of the A/D converter 10Y and then subsamples the data by line offset subsampling to prepare luminance data the data size of which is reduced to ½. The luminance data which has been subsampled by the subsampling circuit 16Y is delayed by a 1-field interval by the delay circuit 18 and is then written into the memory 24.

In the meantime, the color-difference signals Prin and Pbin are respectively converted into digital signals at a sampling frequency fs by the A/D converters 12R and 12B, and the digital signals are subsampled by the subsampling circuits 22R and 22B, thereby providing color-different data the data sizes of which are reduced to ⅓ in their respective vertical directions. Then, the color-different data are subsampled by field offset subsampling by the subsampling circuits 22R and 22B, thereby providing color-different data the data sizes of which are reduced to ½ each. The subsampling circuits 20R, 20B, 22R and 22B apply the filtering processings for eliminating the aforesaid aliasing noise to the respective input data. The outputs of the subsampling circuits 22R and 22B are written into the memory 24.

The luminance data and the two color-difference data which have been written into the memory 24 are rearranged in an order conforming to a recording format of the magnetic tape 34 by means of an address operation, internal data transfer or the like in the memory 24. The rearranged data are read into the error correction encoding circuit 26. The error correction encoding circuit 26 adds an error-correcting code to the data read from the memory 24. The image data to which the error-correcting code has been added by the error correction encoding circuit 26 is applied to the magnetic head 32 through the recording amplifier 28 and the switch 30, and is recorded on the magnetic tape 34 in a predetermined format.

During reproduction, the above-described arrangement operates in the following manner. The magnetic head 32 reproduces the recorded signal from the magnetic tape 34, and the output of the magnetic head 32 is applied to the error correcting circuit 38 through the switch 30 and the reproducing amplifier 36. The error correcting circuit 38 detects and corrects an error introduced during recording and/or reproduction, by utilizing the error-correcting code added by the error correction encoding circuit 26 during the recording. The reproduced data whose error has been corrected are written into the memory 40. Memory means 54 encompasses memory 24 and memory 40.

The data stored in the memory 40 are rearranged from the order conforming to the recording format of the magnetic tape 34 into the order of outputting. Of the reproduced data stored in the memory 40, the luminance data is read into the interpolation circuit 42, while the two color-difference data are respectively read into the interpolation circuits 46R and 46B.

The interpolation circuit 42 interpolates the data which were not selected during the subsampling executed by the subsampling circuit 16Y into the reproduced luminance data read from the memory 40. The output of the interpolation circuit 42 is delayed by a 1-field interval by the delay circuit 44, and is then applied to the D/A converter 50Y. The D/A converter 50Y converts the reproduced luminance data outputted from the delay circuit 44 into an analog signal, and the output of the D/A converter 50Y is outputted from the output terminal 52Y to the outside as a reproduced luminance signal Yout.

The respective interpolation circuits 46R and 46B perform interpolations for the field offset subsampling executed by the subsampling circuits 22R and 22B on the reproduced color-difference data read from the memory 40. The respective interpolation circuits 48R and 48B perform interpolations for the vertical subsampling executed by the subsampling circuits 20R and 20B on the outputs of the interpolation circuits 46R and 46B. The A/D converters 50R and 50B respectively convert the outputs of the interpolation circuits 48R and 48B into analog signals, and the outputs of the A/D converters 50R and 50B are outputted from the output terminals 52R and 52B to the outside as reproduced color-difference signals Prout and Pbout, respectively.

A temporal deviation occurring between the luminance signal Y and the color-difference signal Pr/Pb will be described below. The luminance signal Y is subjected to subsampling (during recording) and interpolation (during reproduction) according to an intrafield computation based on the line offset subsampling, while the color-difference signal Pr/Pb is subjected to subsampling (during recording) and interpolation (during reproduction) according to an interfield computation based on the field offset subsampling. Accordingly, a temporal deviation relative to the field direction occurs between the luminance signal Y and the color-difference signal Pr/Pb. In the present embodiment, such a temporal deviation is cancelled by the delay circuits 18 and 44.

FIGS. 2(*a*) and 2(*b*) show the tap coefficients of the spatial filter of each of the subsampling circuits 20R and 20B, and FIG. 2(*a*) is a schematic view of the structure of selected scanning lines as viewed from the front side of an image plane, while FIG. 2(*b*) is a schematic view of the structure of the selected scanning lines as viewed from one lateral side of the image plane. If the tap coefficients are summed for each field, the weight of the current field is 0.5 and the weight of the previous field is also 0.5, and the weight center of the image in the field direction takes the middle position between the previous field and the current field. In other words, the weight center delays from the current field by a ½-field interval.

Figure 3B:
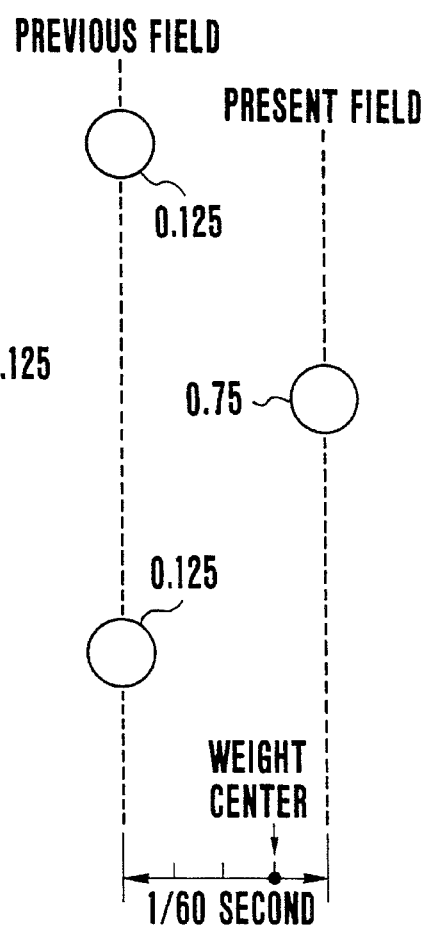

FIGS. 3(*a*) and 3(*b*) show the tap coefficients of the spatial filter of each of the subsampling circuits 22R and 22B, and FIG. 3(*a*) is a schematic view of the structure of selected scanning lines as viewed from the front side of an image plane, while FIG. 3(*b*) is a schematic view of the structure of the selected scanning lines as viewed from one lateral side of the image plane. If the tap coefficients are summed for each field, the weight of the previous field is 0.25 and the weight of the current field is 0.75. In this case, the delay time of the weight center in the field direction is a ¼-field interval.

Accordingly, the subsampling circuits 20R, 22R; 20B, 22B cooperate to delay the color-difference signal Pr/Pb by a ¾-field interval with respect to the luminance signal Y. Therefore, the luminance signal Y is delayed by a 1-field interval by the delay circuit 18. Since it is in practice difficult to delay the luminance signal Y by a ¾-field interval, the amount of the delay in the delay circuit 18 is selected to be a 1-field interval.

In the present embodiment, the aforesaid time difference of ¼-field interval may also be corrected by controlling a read-out operation of the memory 24.

Since a similar delay occurs between the luminance signal Y and the color-difference signal Pr/Pb during reproduction, the luminance signal Y is delayed by a 1-field interval by the delay circuit 44.

As is readily understood from the foregoing description, according to the present invention, it is possible to cancel a temporal deviation occurring between the individual signal components of an input color video signal, whereby subsequent processing is facilitated. For example, in the recording and reproducing apparatus, a temporal deviation which occurs between the individual signal components of a color video signal during recording processing is cancelled before the color video signal is recorded on a recording medium. Accordingly, it is possible to eliminate a deviation between the chrominance and the luminance of a reproduced image of a fast moving object or a similar deviation occurring during special reproduction such as slow reproduction.

What is claimed is:

1. An image processing apparatus, comprising:
   (a) input means to which a luminance component signal and a chrominance component signal are supplied;
   (b) signal processing means for applying a predetermined signal processing to the chrominance component signal;
   (c) delay means for delaying the luminance component signal by at least a processing time which elapses during the predetermined signal processing in said signal processing means;
   (d) memory means for storing an output of said signal processing means and an output of said delay means; and
   (e) recording/reproducing means for recording the output signal from said memory means in a recording medium, and for reproducing the recorded output signal, wherein said memory means also stores the signal reproduced by said recording/producing means.

2. An image processing apparatus according to claim 1, wherein the chrominance component signal includes a plurality of color-difference signals.

3. An image processing apparatus according to claim 1, wherein said signal processing means includes a plurality of signal processing circuits connected in series.

4. An image processing apparatus according to claim 3, wherein said signal processing means includes a subsampling circuit.

5. An image processing apparatus according to claim 1, wherein said signal processing means includes an arrangement for performing interfield signal processing.

6. An image processing apparatus, comprising:
   (a) input means to which a luminance component signal and a chrominance component signal are supplied;
   (b) process means for processing the luminance component signal and the chrominance component signal differently, and correcting difference in time caused by the difference in processing;
   (c) memory means for memorizing an output of the process means; and
   (d) recording/reproducing means for recording the output signal from said memory means in a recording medium, and for reproducing the recorded output signal, wherein said memory means also stores the signal reproduced by said recording/reproducing means.

7. An apparatus according to claim 6, wherein the chrominance component signal includes a plurality of color-difference signals.

8. An apparatus according to claim 6, wherein said signal processing means includes a plurality of signal processing circuits connected in series.

9. An apparatus according to claim 6, wherein said signal processing means includes a subsampling circuit.

10. An apparatus according to claim 6, wherein said signal processing means includes an arrangement for performing interfield signal processing.

11. An image processing apparatus, comprising:
   (a) means for inputting a luminance component signal and a color component signal;
   (b) process means for processing the luminance component signal and the color component signal differently;
   (c) storing means for storing an output of the process means, and correcting difference in time caused by the difference in processing; and
   (d) recording/reproducing means for recording the output signal from said storing means in a recording medium, and for reproducing the recorded output signal, wherein said storing means also stores the signal reproduced by said recording/reproducing means.

12. An apparatus according to claim 11, wherein said storing means is composed of two memory devices.

13. An apparatus according to claim 12, wherein one of said memory devices stores the luminance signal component, and the other stores an output of said one memory device and the color component signal.

* * * * *